United States Patent
Jabbour et al.

(10) Patent No.: US 11,997,189 B2
(45) Date of Patent: May 28, 2024

(54) ENCRYPTED COMMUNICATION USING COUNTER MODE ENCRYPTION AND SECRET KEYS

(71) Applicant: International Business Machines Corporation, Armonk, NY (US)

(72) Inventors: Nadim George Jabbour, Knightdale, NC (US); Ivan Portilla, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 17/186,142

(22) Filed: Feb. 26, 2021

(65) Prior Publication Data

US 2022/0278826 A1 Sep. 1, 2022

(51) Int. Cl.
  *H04L 9/06* (2006.01)
  *H04L 9/08* (2006.01)
(52) U.S. Cl.
  CPC .......... *H04L 9/0656* (2013.01); *H04L 9/0822* (2013.01)
(58) Field of Classification Search
  CPC .................. H04L 9/0656; H04L 9/0822
  See application file for complete search history.

(56) References Cited

U.S. PATENT DOCUMENTS

| | | | |
|---|---|---|---|
| 8,015,393 B2 * | 9/2011 | Fukasawa | H04L 9/3263 713/168 |
| 8,085,933 B2 | 12/2011 | Ferguson | |
| 9,819,656 B2 | 11/2017 | Carlson | |
| 2003/0039357 A1 * | 2/2003 | Alten | H04L 9/0656 380/46 |
| 2003/0108205 A1 | 6/2003 | Joyner et al. | |
| 2003/0112972 A1 * | 6/2003 | Hattick | H04L 9/0656 380/46 |
| 2004/0139336 A1 | 7/2004 | McLean | |
| 2006/0221760 A1 | 10/2006 | Chen | |
| 2015/0244520 A1 | 8/2015 | Kariman et al. | |
| 2017/0272239 A1 | 9/2017 | Minematsu | |
| 2017/0302454 A1 | 10/2017 | Jacquin | |
| 2018/0294968 A1 | 10/2018 | Johnson | |
| 2020/0351078 A1 * | 11/2020 | Kolte | G06F 21/602 |
| 2021/0058237 A1 * | 2/2021 | Sandberg | G06F 21/72 |

OTHER PUBLICATIONS

International Search Report and Written Opinion for Application PCT/CN2022/071197, Mar. 24, 2022, 9 pages.

\* cited by examiner

*Primary Examiner* — Daniel B Potratz
(74) *Attorney, Agent, or Firm* — Scott S. Dobson (57) ABSTRACT

A secret key is communicated to a receiver system. A one-time pad is generated using the secret key and a counter. An encrypted message is generated by performing an XOR operation on a first message using the one-time pad. The encrypted message and the counter are sent to the receiver system.

20 Claims, 8 Drawing Sheets

ENCRYPTED COMMUNICATION USING COUNTER MODE ENCRYPTION AND SECRET KEYS

BACKGROUND

The present disclosure relates to data encryption, and more specifically, to data encryption for communication between systems.

End-to-end encryption (E2EE) involves encrypting data at the sender system, communicating the encrypted message to the receiver, and decrypting the message at the receiver system. Because the message is encrypted before it leaves the sender, any system that has access to the message between the sender and the receiver will be unable to read the message.

SUMMARY

According to embodiments of the present disclosure, a method for secure communications is provided. The method includes communicating a secret key to a receiver system. A one-time pad is generated using the secret key and a counter. An encrypted message is generated by performing an XOR operation on a first message using the one-time pad. The encrypted message and the counter are sent to the receiver system.

According to further embodiments of the present disclosure, a second method for secure communications is provided. The method includes receiving a secret key from a sender system. A first one-time pad is generated using the secret key and a counter. An encrypted message is received from the sender system. The encrypted message is decrypted by performing an XOR operation on the encrypted message with the first one-time pad.

According to further embodiments of the present disclosure, a system and computer program product for performing the methods is provided.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to encrypted communication between computing systems, and more particular aspects relate to encrypted communication between computing systems using secret keys and counter mode encryption. While the present disclosure is not necessarily limited to such applications, various aspects of the disclosure may be appreciated through a discussion of various examples using this context.

There is an exponential growth of distributed systems that require the ability to transfer large secure volumes of data quickly. With advancing technologies, such as 5G networks, the bottleneck of data transfer is being shifted from transfer speed to processing capabilities of the devices themselves. In order to ensure the security of data being transferred, the data needs to be encrypted before it is sent out and decrypted once it is received. In prior art processes, encryption and decryption operations are on the critical path for data transfer. Removing the encryption and decryption operations from the critical path may improve the speed of data transfer in end-to-end encryption.

Embodiments of the present disclosure provide a method, system, and computer program product for end-to-end encryption that removes encryption and decryption operations from the critical path for data transfer. Embodiments of the present disclosure may use a combination of asymmetric keys, symmetric keys, and counter mode encryption.

In an initial handshake operation, a sender system may communicate a secret key to a receiver system using asymmetric cryptography. The sender system may then use counter mode encryption using a counter and the secret key to generate a one-time pad. The sender system may then generate an encrypted message by performing an XOR (exclusive OR) operation on a message using the one-time pad. The encrypted message may then be sent to the receiver system with the counter that was used to generate the one-time pad used in the XOR operation. The receiver system may generate its own one-time pad using a counter and the secret key and perform an XOR operation using the one-time pad and the ciphertext to generate the plaintext message.

Notably, both systems can generate the one-time pad before it needs to be used to encrypt a message. Making one-time pad generation independent of the message allows the one-time pad to be generated before or in parallel with the message, which may improve the speed of data transfer in end-to-end encryption. Compared with prior art methods, the critical path elements of encryption-communication-decryption are replaced with XOR-communication-XOR. XOR is a simpler operation that takes less time to complete than traditional encryption operations and decryption operations. Thus, the speed of communication may be improved over prior art methods.

In some embodiments, the receiver system may generate a plurality of one-time pads and store them along with the values of the counter that were used to generate them. When the receiver system receives the counter and encrypted message from the sender, the receiver system can identify the correct stored one-time pad using the value of the received counter. Thus, these embodiments allow for decrypting messages that are received out of order.

While reference is made herein to a sender system and a receiver system, each system may be configured to operate as either the sender system or the receiver system in some embodiments. Further, in some embodiments a single system may simultaneously operate as a receiver system with respect to a first computing system while operating as a sender system with respect to a second computing system.

Figure 1:
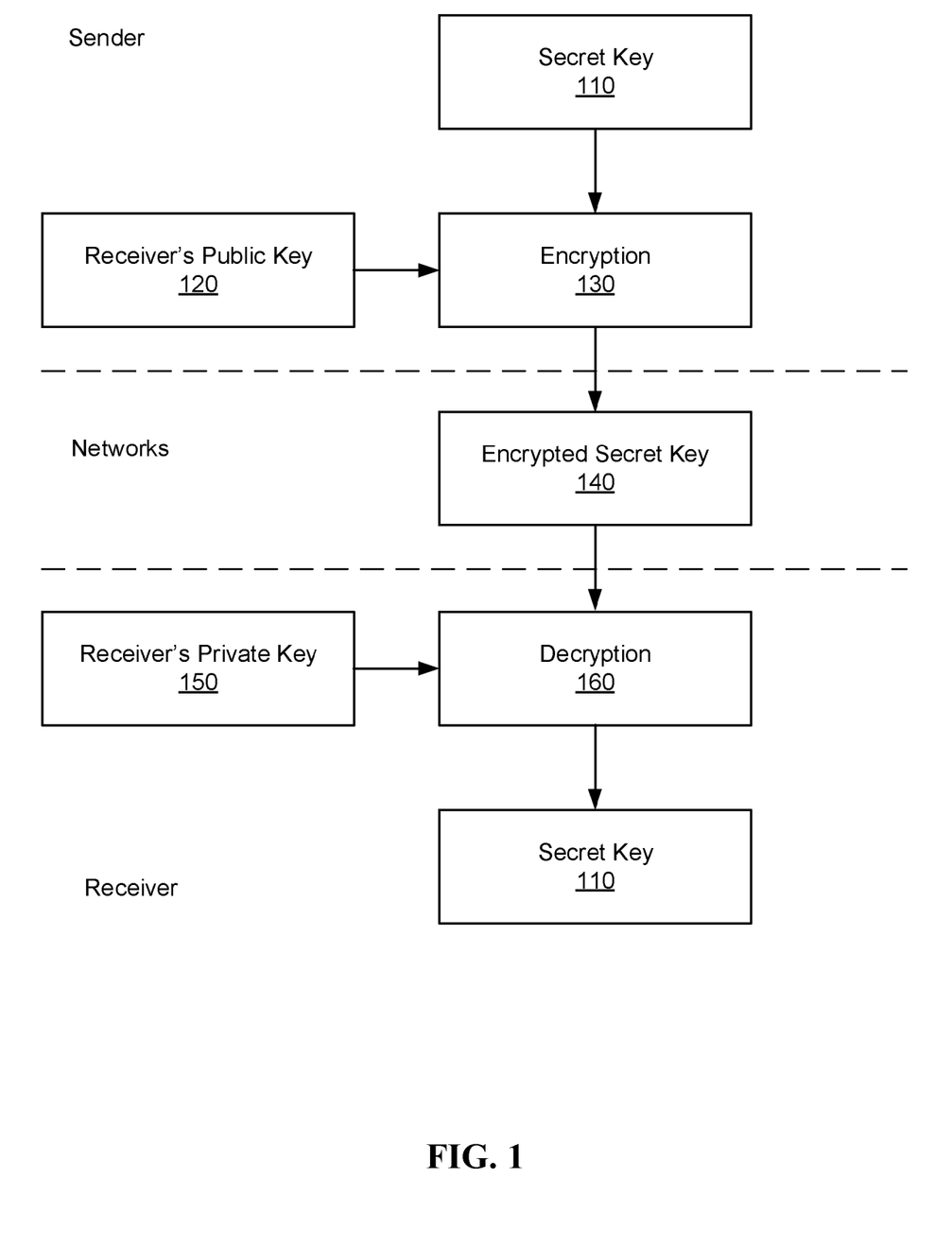
FIG. 1 depicts an illustrative flow diagram of an initial handshake operation between a sender computing system and a receiver computing system using asymmetric cryptography according to embodiments.

Referring now to FIG. 1, an illustrative flow diagram of an initial handshake operation between a sender computing system and a receiver computing system using asymmetric cryptography is depicted according to embodiments. Asymmetric cryptography involves the use of public and private keys. A public key may be used to encrypt data such that it can only be decrypted using the corresponding private key. The public key may be made available to others to encrypt data, while the corresponding private key may be kept secret so that only the holder of the private key may decrypt data that is encrypted using the public key.

The sender computing system may generate a unique secret key 110 to use for future communications with the receiver computing system. The sender computing system may generate an encrypted secret key 140 by encrypting 130 the secret key 110 with receiver's public key 120. The sender system may then communicate the encrypted secret key 140 over one or more networks to the receiver computing system. The receiver computing system may decrypt 160 the encrypted secret key 140 using the receiver's private key 150.

As shown, only encrypted secret key 140 is communicated over the one or more networks. Since the encrypted secret key 140 can only be decrypted using the receiver's private key 150, if the encrypted secret key 140 is compromised as it is communicated through the one or more networks (e.g., through a person-in-the-middle attack), the secret key is protected. Thus, after the initial handshake operation depicted in FIG. 1, the sender system and the receiver system may each have secret key 110 which is only available to the two computing systems.

Figure 2:
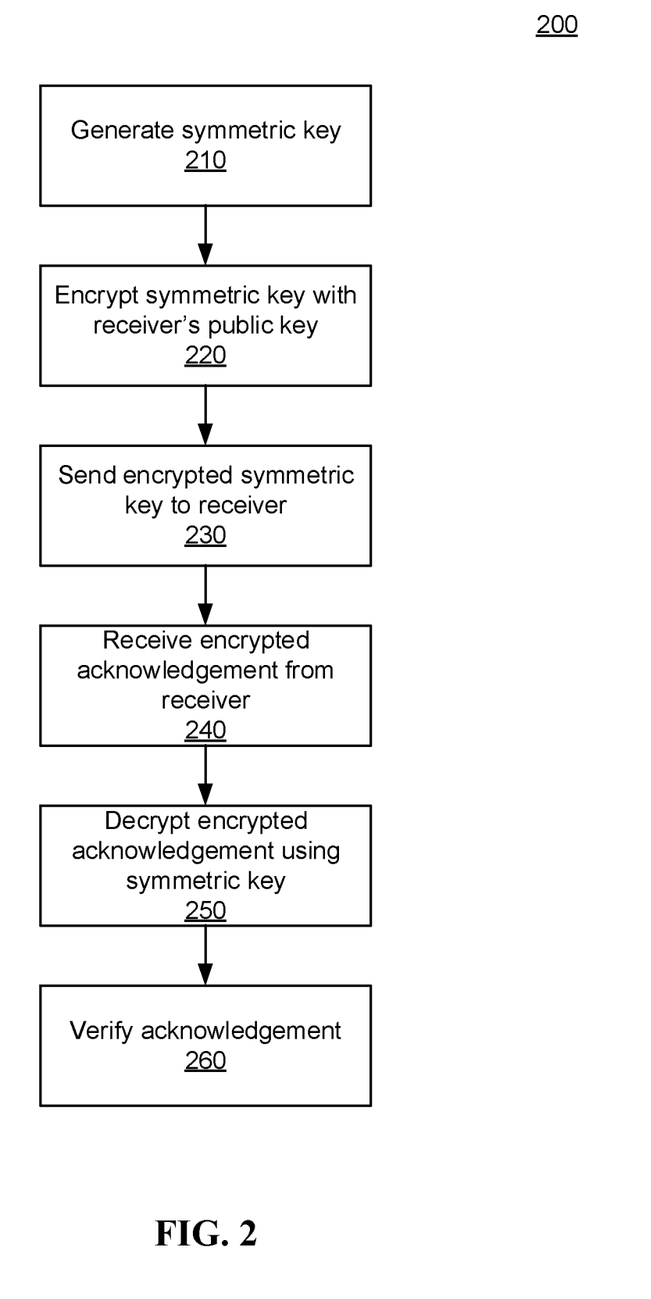
FIG. 2 depicts a flowchart of a method for a sender system sharing a secret key with a receiver according to embodiments.

Referring now to FIG. 2, a flowchart of a method 200 for a sender system sharing a secret key with a receiver is depicted according to embodiments. Method 200 may be performed using any suitable computing system. For example, method 200 may be performed by computer system 801 described in reference to FIG. 8.

Method 200 begins with generating a secret key at operation 210. The secret key may be a unique key that will be used only for communication with the receiver computing system. The secret key may be generated according to any suitable algorithm.

At operation 220, the secret key is encrypted with the receiver's public key. As described herein, the receiver's public key may be used to encrypt data such that it can only be decrypted using the receiver's private key. The encryption may be performed using any suitable encryption algorithm.

At operation 230, the encrypted secret key is sent to the receiver. The encrypted secret key may be communicated over one or more networks to a receiver system.

At operation 240, the sender system may receive an encrypted acknowledgment from the receiver system in response to sending the encrypted secret key. As will be described in reference to FIG. 3, the receiver computing system may generate an acknowledgment and encrypt the acknowledgment using the secret key received from the sender system.

At operation 250, the sender system decrypts the encrypted acknowledgment using the secret key to obtain the acknowledgment. The encrypted acknowledgment may be decrypted using any suitable decryption algorithm corresponding to the encryption algorithm.

At operation 260, the sender system verifies the acknowledgment. In some embodiments, the computing system may verify the acknowledgment by comparing the acknowledgment to an expected acknowledgment to determine if there is a match. In some embodiments, the computing system may verify the acknowledgment by determining whether the acknowledgment is readable. Once the acknowledgment is verified, the sender system can start using the secret key as described herein to communicate encrypted messages to the receiver.

Figure 3:
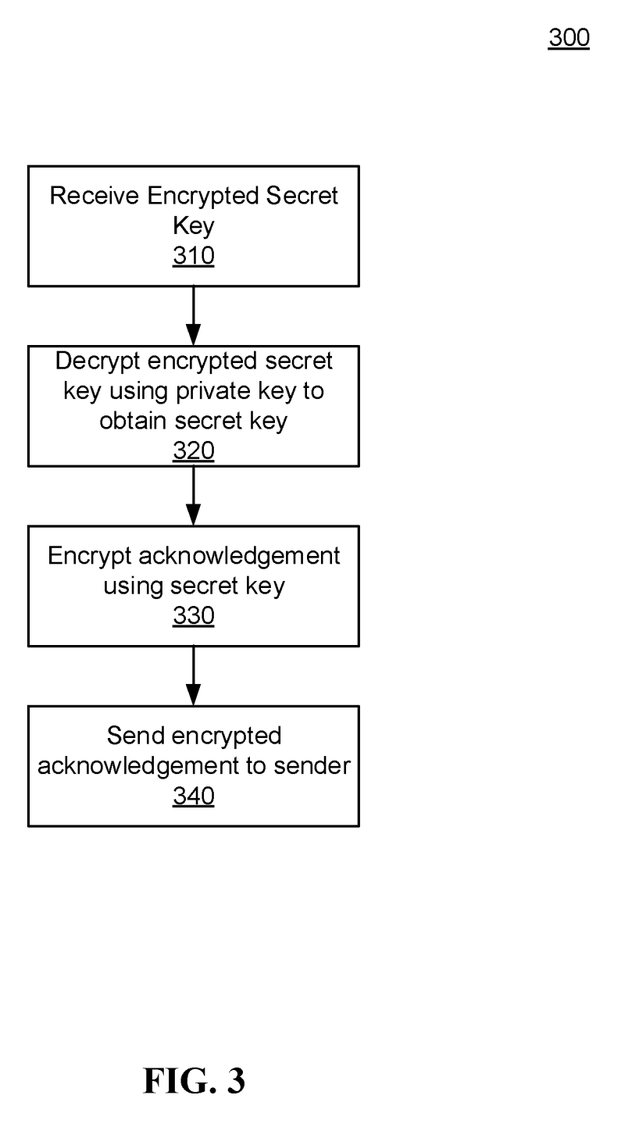
FIG. 3 depicts a flowchart of a method for a receiver system obtaining the secret key from a sender system according to embodiments.

Referring now to FIG. 3, a flowchart of a method 300 for a receiver system obtaining the secret key from a sender system is depicted according to embodiments. Method 300 may be performed using any suitable computing system. For example, method 300 may be performed by computer system 801 described in reference to FIG. 8.

At operation 310, the receiver system receives the encrypted secret key from the sender over one or more networks. The encrypted secret key may be encrypted using the receiver's public key.

At operation 320, the encrypted secret key is decrypted using the receiver's private key. The receiver system may use any suitable decryption algorithm corresponding to the encryption algorithm.

At operation 330, the receiver system may encrypt an acknowledgment message using the secret key. The receiver system may use any suitable encryption that would allow decryption by the receiver using the same secret key.

At operation 340, the receiver system may send the encrypted acknowledgment to the sender over one or more networks. Sending the acknowledgment encrypted by the private key may show the sender system that the receiver system has received the private key.

Figure 4:
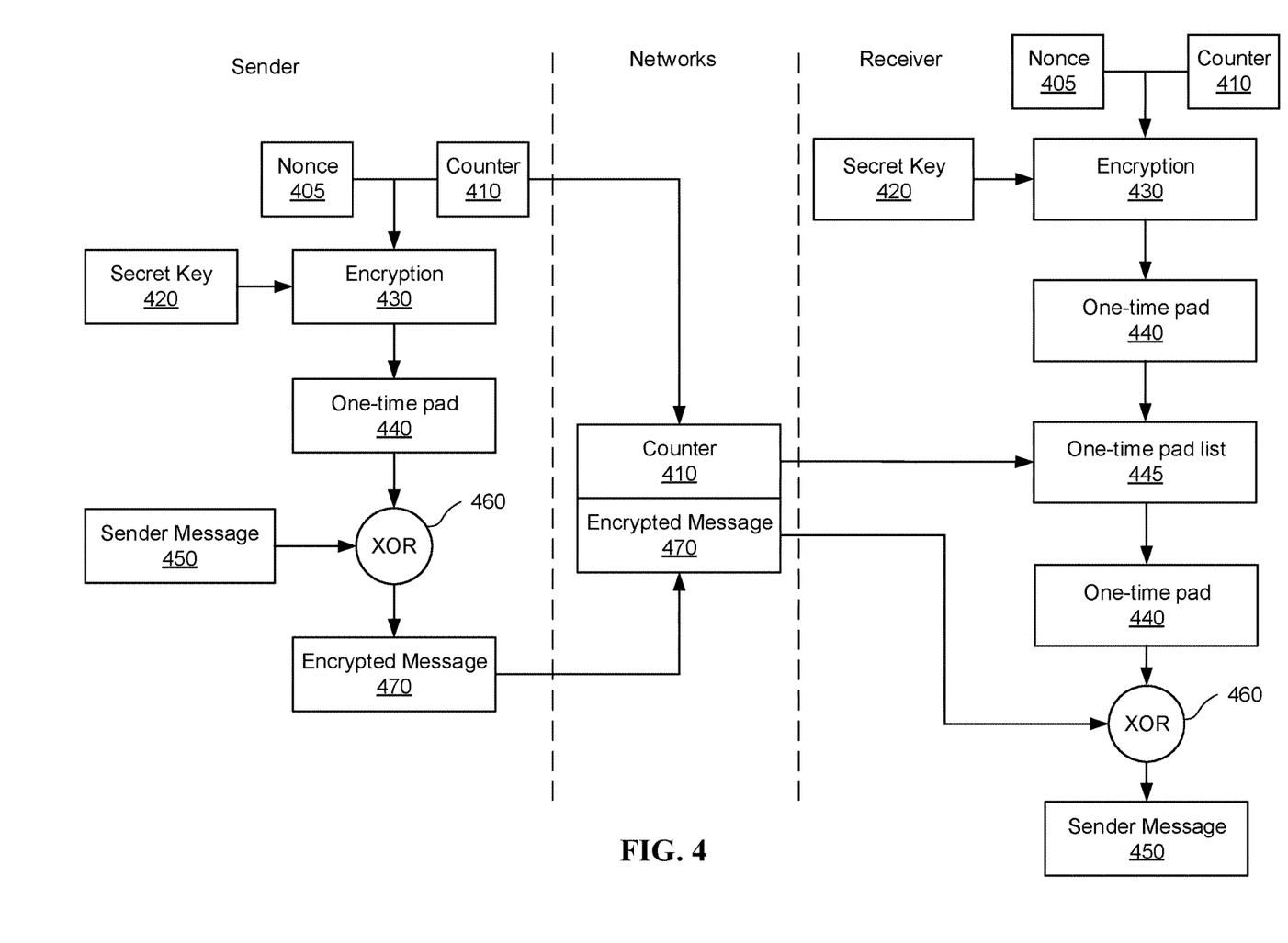
FIG. 4 depicts an illustrative flow diagram of end-to-end encryption of messages according to embodiments.

Referring now to FIG. 4, an illustrative flow diagram of end-to-end encryption of messages is depicted according to embodiments. The illustrated flow includes counter mode encryption using secret key 420. As depicted, the sender system and the receiver system may each have the same secret key 420. The secret key 420 may be generated by the sender computing system and sent to the receiver computing system in an initial handshake operation as described herein.

As depicted, both the sender system and the receiver system may encrypt 430 a combination of nonce 405 and counter 410 using the secret key 420 to generate a one-time pad 440. Nonce 405 may be an initialization vector of a set length. Counter 410 may be a numeric counter with a value that is incremented each time a one-time pad is generated. Counter 410 may be any size, but ideally it will be large enough to ensure that it does not overflow (i.e., the number of pads generated does not exceed the maximum value of the counter). The counter may begin at any value and may be configured to increment in any value for generating each subsequent one-time pad. For example, the counter may begin at 0000 for generating the first one-time pad and increment by 1 for each subsequent one-time pad. Thus, in this example, the counter for generating the second one-time pad would be 0001. While nonce 405 and counter 410 are depicted as separate, they may be parts of the same string.

As depicted, the receiver system may store the generated one-time pad 440 in a one-time pad list 445. The receiver system may then continue to generate one-time pads by incrementing the counter and encrypting the nonce and the counter with the secret key 420. While FIG. 4 does not show a corresponding one-time pad list on the sender system, in some embodiments the sender system may also have a one-time pad list storing one-time pads for future use.

The sender system may encrypt a sender message 450 by performing an XOR operation 460 with one-time pad 440 to generate encrypted message 470. The sender system may then concatenate the counter 410 corresponding to the one-time pad 440 and encrypted message 470. For example, the counter X bytes long may be added to the beginning of the encrypted message and the receiver system may be configured to identify the first X bytes as the counter and the remaining bytes as the encrypted message.

The sender system may send the counter 410 and the encrypted message 470 to the receiver system via one or more networks. The receiver system may identify the one-time pad 440 corresponding to the counter 410 in a one-time pad list 445. For example, the receiver system may perform a table lookup using the counter to identify the corresponding on-time pad.

The receiver system may perform an XOR operation 460 on the encrypted message 470 using the one-time pad 440 to generate sender message 450.

As depicted, only encrypted message 470 and counter 410 are communicated over the one or more networks. The counter does not need to be encrypted because the counter alone, without the secret key, cannot be used to decrypt the encrypted message, and the secret key is only known by the sender system and the receiver system. Thus, if the encrypted message is compromised as it is communicated through the one or more networks (e.g., through a person-in-the-middle-attack), the sender's message is protected.

While FIG. 4 depicts a sender system sending encrypted messages to a receiver system, in some embodiments, the receiver system may also be configured to send encrypted messages to the sender system. In some embodiments, messages sent from the receiver system to the sender system may use a different counter from messages sent from the sender system to the receiver system. For example, when generating one-time pads for sending messages from the sender system to the receiver system, both systems may use even counter values, while using odd counter values for messages from the receiver system to the sender system.

Figure 5:
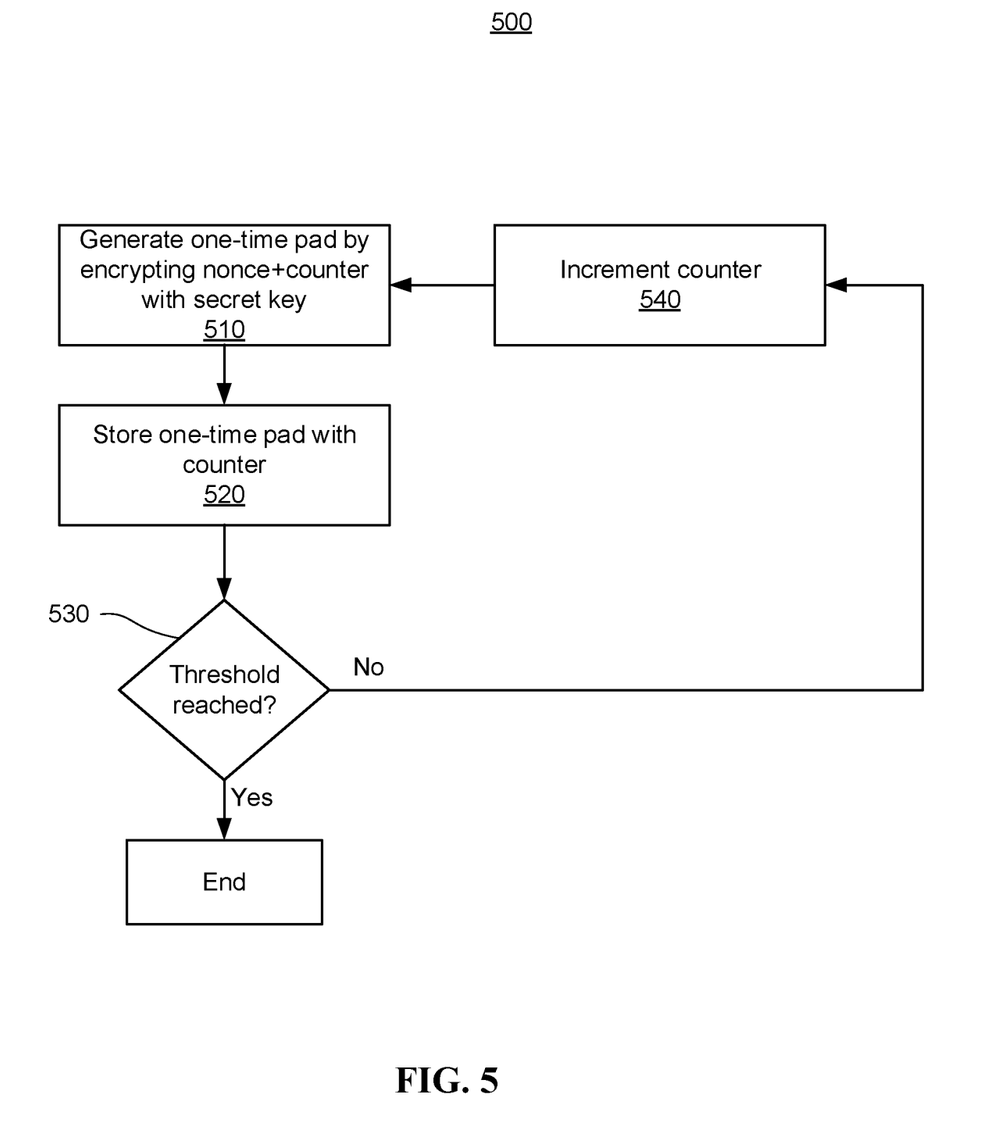
FIG. 5 depicts a flowchart of a method for generating one-time pads according to embodiments.

Referring now to FIG. 5, a flowchart of a method 500 for generating one-time pads is depicted according to embodiments. Method 500 may be performed by a sender system or a receiving system. Method 500 may be performed using any suitable computing system. For example, method 500 may be performed by computer system 801 described in reference to FIG. 8.

Method 500 may begin after the initial handshake operation described in reference to FIGS. 1-3. At operation 510, the system may generate a one-time pad by encrypting the nonce and counter with the secret key. The system may use any suitable encryption algorithm for generating a one-time pad.

At operation 520, the system may store the one-time pad. The one-time pad and counter may be stored in any suitable computer storage such that the system may look up the corresponding one-time pad based on the counter.

At operation 530, the system may determine whether a threshold number of one-time pads have been stored. The threshold number of one-time pads may be preconfigured. In some embodiments, the threshold number is the maximum number of one-time pads that can be generated based on the size of the counter (i.e., the threshold may be reached when the counter has reached its maximum value). In some embodiments, the threshold number may be chosen based on the rate of messages being sent to ensure that one-time pads will be available when needed.

If the threshold number of one-time pads stored has not been reached, the system may increment the counter at operation 540 and repeat operations 510 and 520. If the threshold has been reached, method 500 ends.

Figure 6:
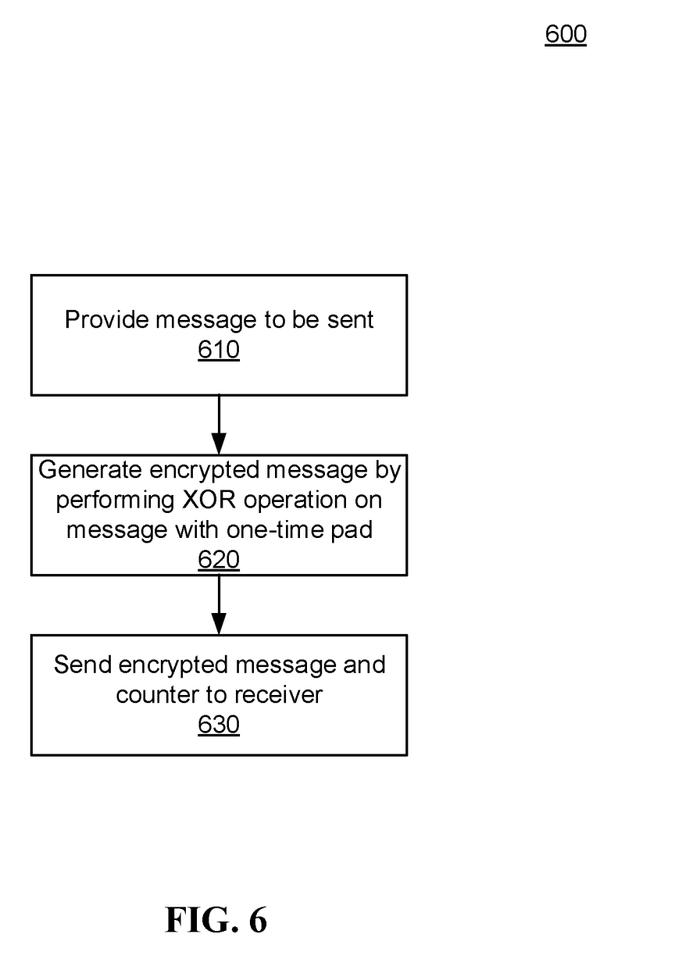
FIG. 6 depicts a flowchart of a method for a sender system to send an encrypted message according to embodiments.

Referring now to FIG. 6, a flowchart of a method 600 for a sender system to send an encrypted message is depicted according to embodiments. Method 600 may be performed using any suitable computing system. For example, method 600 may be performed by computer system 801 described in reference to FIG. 8.

At operation 610, a message to be sent to a receiver system is provided. At operation 620, the sender system generates an encrypted message by performing an XOR operation on the message with a one-time pad. The sender system may have generated a plurality of one-time pads and stored them with their associated counters such as described in reference to FIG. 5. The sender system may select a one-time pad from the stored one-time pads for performing the XOR operation. The one-time pad may be selected from a based on its association with the lowest counter.

At operation 630, the encrypted message and the counter associated with the one-time pad used to encrypt the message are sent to the sender system over one or more networks. The counter and the encrypted message may be concatenated in a predetermined way. For example, the counter may be added before the encrypted message such that the first bytes are the counter and the remaining bytes are the encrypted message.

Figure 7:
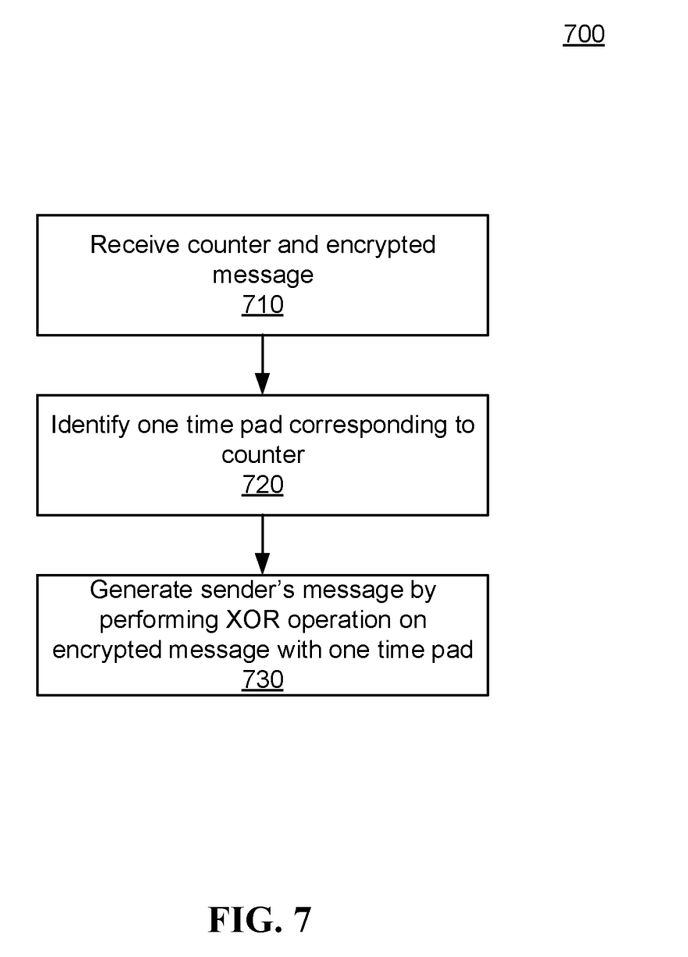
FIG. 7 depicts a flowchart of a method for decrypting an encrypted message by a receiver system according to embodiments.

Referring now to FIG. 7, a flowchart of a method 700 for decrypting an encrypted message by a receiver system is depicted according to embodiments. Method 700 may be performed using any suitable computing system. For example, method 700 may be performed by computer system 801 described in reference to FIG. 8.

At operation 710, the receiver system receives the counter and encrypted message from the sender system. At operation 720, the receiver identifies a one-time pad corresponding to the received counter. As described in reference to FIG. 5, the receiver system may have a plurality of one-time pads stored with their associated counters. The receiver system may identify the correct one-time pad by performing a table lookup using the received counter. At operation 730, the system generates the sender's message by performing an XOR operation on the encrypted message with the one time pad.

Figure 8:
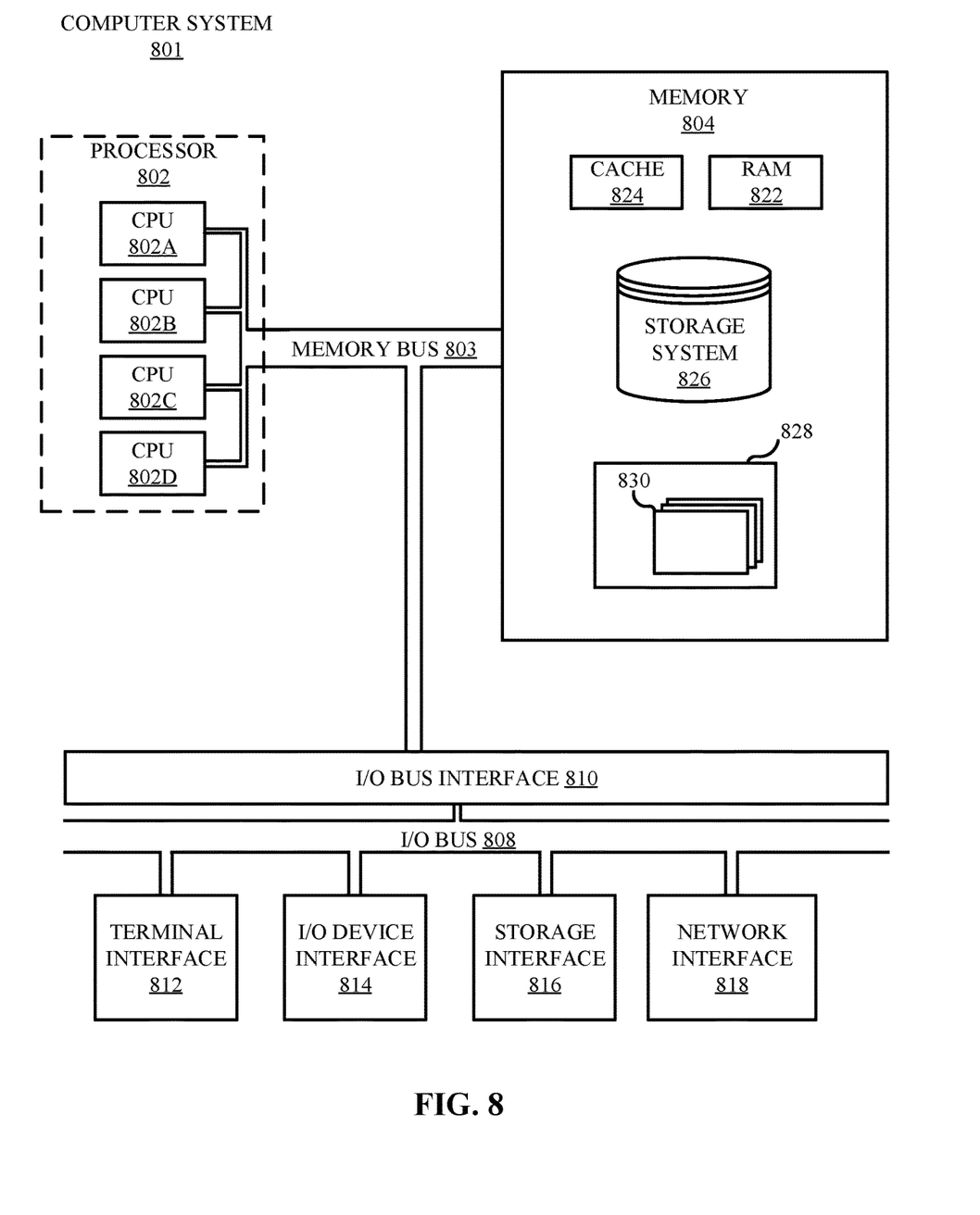
FIG. 8 depicts a high-level block diagram of an example computer system according to embodiments.

Referring now to FIG. 8, shown is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used, and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A method for secure communications, the method comprising:
   communicating a secret key to a receiver system;
   generating a plurality of a one-time pads by encrypting a counter using the secret key, each one-time pad corresponding to a different value of the counter;
   after generating the plurality of one-time pads, providing a message;
   generating an encrypted message by performing an XOR operation on the message using a one-time pad from the plurality of one-time pads; and
   sending the encrypted message and a value of the counter corresponding to the one-time pad to the receiver system.

2. The method of claim 1, wherein communicating the secret key to the receiver system comprises:
   generating an encrypted secret key by encrypting the secret key with a public key; and
   sending the encrypted secret key to the receiver system.

3. The method of claim 2, further comprising:
   in response to sending the encrypted secret key to the receiver system, receiving an encrypted acknowledgement from the receiver system;
   decrypting the encrypted acknowledgement using the secret key; and
   verifying the acknowledgement.

4. The method of claim 1, wherein generating the plurality of one-time pads comprises:
   generating a first one-time pad using a first value of the counter,
   incrementing the counter to a second value, and
   generating a second one-time pad using the second value of the counter, and wherein the method further comprises:
   after generating the plurality of one-time pads, providing a second message;
   generating a second encrypted message by performing an XOR operation on the second message using the second one-time pad; and
   sending the second encrypted message and the second value of the counter to the receiver system.

5. The method of claim 1, wherein generating the plurality of one-time pads comprises encrypting a combination of a nonce and the counter with the secret key.

6. A method for secure communications, the method comprising:
   receiving a secret key from a sender system;
   generating a plurality of first one-time pads by encrypting a counter using the secret key, each one-time pad corresponding to a different value of the counter;
   after generating the plurality of one-time pads, receiving an encrypted message and a value of the counter from the sender system; and
   decrypting the encrypted message by performing an XOR operation on the encrypted message with the a one-time pad from the plurality of one-time pads, the one-time pad corresponding to the received value of the counter.

7. The method of claim 6, wherein the generating the plurality of one-time pads comprises:
   generating a first one-time pad using a first value of the counter,
   incrementing the counter to a second value, and
   generating a second one-time pad using the second value of the counter,
   and wherein the method further comprises:
   storing the first one-time pad with the first value of the counter and the second one-time pad with the second value of the counter; and
   identifying, in response to receiving the first value of the counter from the sender system with the encrypted message, the first one-time pad, wherein the performing the XOR operation on the encrypted message with the one-time pad is performing the XOR operation on the encrypted message with the first one-time pad in response to the identifying the first one-time pad.

8. The method of claim 6, wherein receiving the secret key from the sender system comprises:
   receiving an encrypted secret key from the sender system, the encrypted secret key encrypted using a public key; and
   decrypting the encrypted secret key using a private key corresponding to the public key.

9. The method of claim 8, further comprising:
   in response to receiving the secret key, encrypting an acknowledgement using the secret key; and
   sending the encrypted acknowledgement to the sender system.

10. The method of claim 6, wherein generating the plurality of one-time pads comprises encrypting a combination of a nonce and the counter with the secret key.

11. A computer program product for secure communications, the computer program product comprising a computer readable storage medium having program instruction embodied therewith, the program instructions executable by a processor to perform operations comprising:
    communicating a secret key to a receiver system;
    generating a plurality of one-time pads by encrypting a counter using the secret key, each one-time pad corresponding to a different value of the counter;
    after generating the plurality of one-time pads, providing a message;
    generating an encrypted message by performing an XOR operation on the message using a one-time pad from the plurality of one-time pads; and
    sending the encrypted message and a value of the counter corresponding to the one-time pad to the receiver system.

12. The computer program product of claim 11, wherein communicating the secret key to the receiver system comprises:
    generating an encrypted secret key by encrypting the first secret key with a public key; and
    sending the encrypted secret key to the receiver system.

13. The computer program product of claim 12, wherein the operations further comprise:

in response to sending the encrypted secret key to the receiver system, receiving an encrypted acknowledgement from the receiver system;

decrypting the encrypted acknowledgement using the first secret key; and verifying the acknowledgement.

14. The computer program product of claim 11, wherein generating the plurality of one-time pads comprises:

generating a first one-time pad using a first value of the counter, incrementing the counter to a second value, and generating a second one-time pad using the second value of the counter, and wherein the operations further comprise:

after generating the plurality of one-time pads, providing a second message;

generating a second encrypted message by performing an XOR operation on the second message using the second one-time pad; and sending the second encrypted message and the second value of the counter to the receiver system.

15. The computer program product of claim 11, wherein generating the one-time pad comprises encrypting a combination of a nonce and the counter with the first secret key.

16. The computer program product of claim 11, wherein the operations further comprise:

receiving a second secret key from a sender system;

generating a second plurality of one-time pads using the second secret key and a second counter, each of the second plurality of one-time pads corresponding to a different value of the second counter;

receiving a second encrypted message from the sender system; and decrypting the second encrypted message by performing an XOR operation on the second encrypted message with a one-time pad from the second plurality of one-time pads.

17. The computer program product of claim 16, wherein generating the second plurality of one-time pads comprises:

generating a first one-time pad using a first value of the second counter, incrementing the second counter to a second value, generating a second one-time pad the second value of the second counter, and wherein the operations further comprise:

storing the first one-time pad with the first value of the second counter and the second one-time pad with the second value of the second counter; and identifying, in response to receiving the second value of the second counter from the sender system with the encrypted message, the second one-time pad, wherein the performing the XOR operation on the second encrypted message with the one-time pad is performing the XOR operation on the encrypted message with the second one-time pad in response to the identifying the second one-time pad.

18. The computer program product of claim 16, wherein receiving the second secret key from the sender system comprises:

receiving an encrypted secret key from the sender system, the encrypted secret key encrypted using a public key; and decrypting the encrypted secret key using a private key corresponding to the public key.

19. The computer program product of claim 18, wherein the operations further comprise:

in response to receiving the second secret key, encrypting an acknowledgement using the second secret key; and sending the encrypted acknowledgement to the sender system.

20. The computer program product of claim 16, wherein generating the second plurality of one-time pads comprises encrypting a combination of a nonce and the second counter with the second secret key.

* * * * *